Dec. 9, 1941.　　　A. J. HENDERSON　　　2,265,526
LUBRICATING DEVICE
Filed April 1, 1939　　　2 Sheets-Sheet 1

INVENTOR.
Albert J. Henderson

Dec. 9, 1941.  A. J. HENDERSON  2,265,526
LUBRICATING DEVICE
Filed April 1, 1939  2 Sheets-Sheet 2

INVENTOR.
Albert J. Henderson

Patented Dec. 9, 1941

2,265,526

UNITED STATES PATENT OFFICE 2,265,526

LUBRICATING DEVICE

Albert J. Henderson, Hempfield Township, Westmoreland County, Pa., assignor to Walworth Patents Inc., Boston, Mass., a corporation of Massachusetts Application April 1, 1939, Serial No. 265,430

9 Claims. (Cl. 184—38)

This invention relates to lubricating devices and more particularly to lubricating devices for valves. It is particularly adapted, although not limited, for services where high line pressure acting on one side of a valve member or the like, tend to force it tightly against its seat on the opposite side.

An object of this invention is to apply lubricant pressure to a member in such manner as to counteract the effect of line pressure acting thereon.

Another object of the invention is to control the direction of lubricant flow in a positive manner.

Another object of the invention is to render such control entirely automatic.

Another object of the invention is to relieve the operator of the device of any responsibility in determining which side of the member under pressure requires lubrication.

Another object of the invention is to permit the use of a single compressor for creating the necessary pressure on the lubricant to force it to one part or another of the seat.

Another object of the invention is to ensure lubricant flow to the part of the seat which requires it regardless of the direction of flow of the line fluid.

Another object of the invention is to render the device removable as a unit from the structure to which it may have been applied.

Another object of the invention is to construct the device in such manner that it will be reliable in operation and will not easily wear out or become disorganized.

Other objects and advantages will become apparent from the following description taken in connection with the accompanying drawings wherein.

Figure 1:
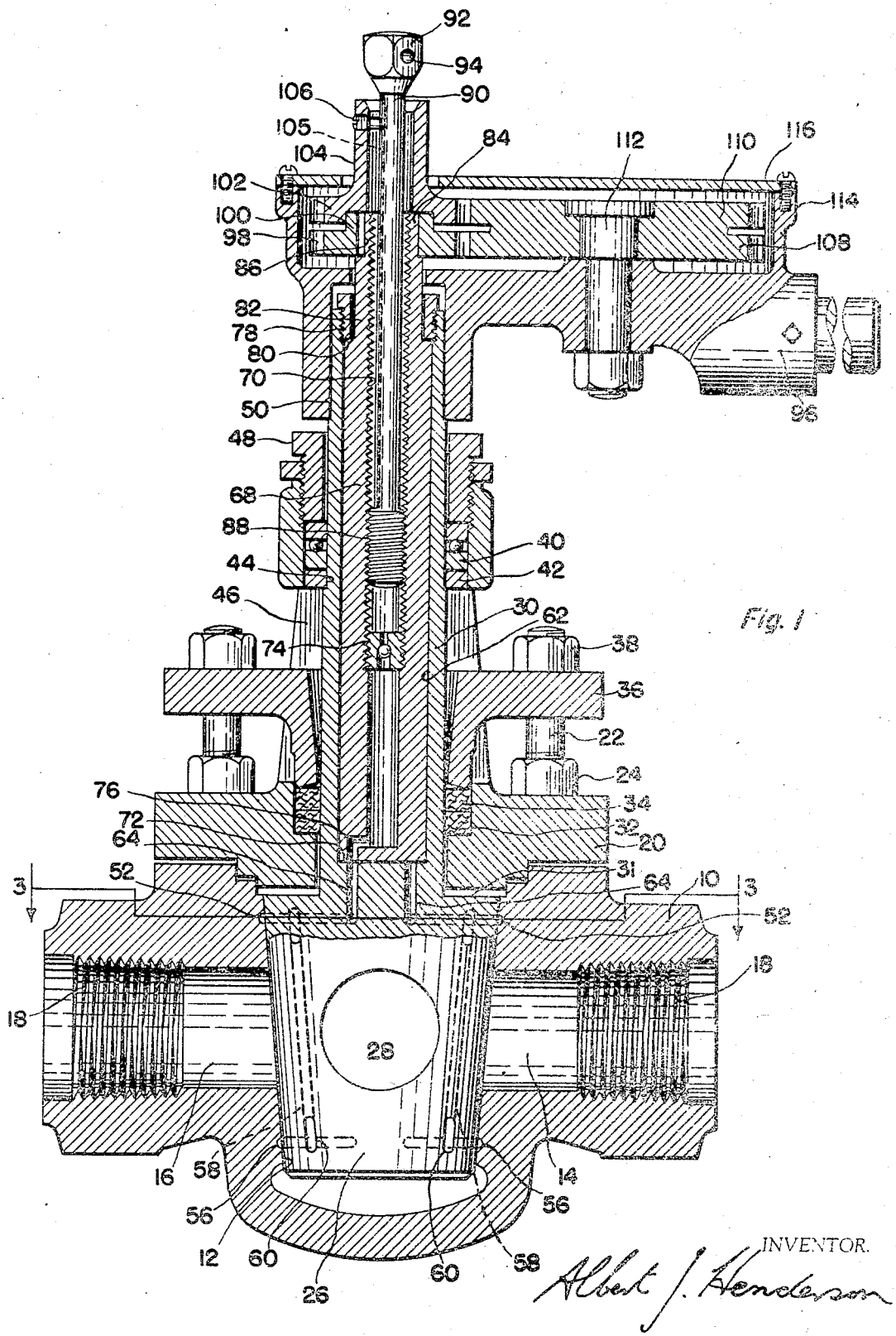
Fig. 1 is a longitudinal section through a valve having the invention incorporated therein.

In this exemplary embodiment, the invention is applied to a lubricated plug valve but it will be apparent that its application is not limited to valves of this type or to valves generally. Referring more particularly to the drawings, the valve illustrated therein comprises a body member 10 having a tapered valve seat 12 provided with passageways 14 and 16 extending transversely thereof. The fluid passageways 14 and 16 extend from the valve seat 12 completely through the body 10 and may be provided at their outer ends with internal threaded portions 18, or other suitable connecting means, for securing the valve in a pipe line. At the larger end of the valve seat 12 is a cover 20 secured to the body 10 by means of the studs 22 and nuts 24.

Seated in the body 10 and rotatably engaging the valve seat 12 is a tapered plug member 26 having the port 28 extending transversely therethrough and being adapted to register with the passageways 14 and 16 when the valve is in open position. A stem 30 which projects from the larger end of the plug member 26 and defines a shoulder 31 thereon, extends through the cover 20 which is recessed to form a stuffing box 32 around the stem. A packing 34 is received within the stuffing box 32 and may be compressed into engagement with the stem 30 by means of a packing gland 36 adjustable by means of nuts 38 engaging the studs 22 which project through the cover 20 and the gland 36 for this purpose.

In the form of valve disclosed in this embodiment of the invention the plug member 26 is retained in its seat by the provision of an antifriction bearing 40 which is seated on a retainer member 42 engaging a shoulder 44 on the valve stem 30 beyond the packing gland 36. The bearing 40 and retainer 42 are inclosed by a yoke 46 extending from the cover 20 and provided with an adjusting member 48 engaging the bearing 40. The stem 30 extends beyond the adjusting member 48 and the projecting end 50 is suitably squared or otherwise shaped for the reception of a wrench or other tool whereby the valve member 26 may be rotated in its seat.

Lubricant may be distributed to the valve seat in such valves by means of a system of lubricant grooves formed therein. In this instance, the valve seat 12 is provided with a pair of diametrically opposite, transverse, lubricant grooves 52, each of which is located above one of the fluid passageways 14 and 16 respectively, said grooves together substantially surrounding the valve seat but having blind ends providing a pair of lands 54 therebetween. The seating surface 12 is further provided with a pair of diametrically opposite, transverse, lubricant grooves 56, each located below one of the fluid passageways 14 and 16, and having blind ends similar to the lubricant grooves 52 which are positioned thereabove. Furthermore, the valve seat 12 is provided with four longitudinal grooves 58, which are located on each side of the passageways 14 and 16 between the transverse grooves 52 and 56 at each end of the body, but terminating short of connection with these transverse grooves.

The lubricant grooving system for the valve is completed by the provision of eight dwarf grooves 60, four of which are located above the port 28 in the valve member and the remaining four therebelow. These dwarf grooves 60 are substantially equally spaced around the periphery of the valve member 26 in such manner as to overlie the ends of the longitudinal grooves 58 and connect these longitudinal grooves to the transverse grooves 52 and 56 when the valve is in the full open and the full closed positions. There is thus a complete and independent frame of lubricant grooves around the passageways in both positions. When the valve member 26 is rotated in the valve seat 12 from either the full open or full closed position, the dwarf grooves 60 immediately become disconnected from communication with the longitudinal grooves and the two diametrically opposite longitudinal grooves 58 which are exposed to the fluid in the line as the port 28 passes across them will be disconnected from the lubricant grooving system.

This invention is more particularly directed to controlling the flow of lubricant to each frame of lubricant grooves in a positive manner. To this end, the valve stem 30 is provided with an axial bore 62 which terminates adjacent the shoulder 31. A pair of lubricant passages 64 extend from the bottom of the bore 62, substantially parallel with the axis of the valve stem 30, but offset and spaced on each side of this axis. Connected at one end to each passage 64 and extending substantially perpendicular thereto, is a pair of branch passages 66 which diverge therefrom and communicate at their spaced ends with the dwarf grooves 60 formed in the upper portion of the valve member 26. The passages 64, together with their branches 66, thus provide separate sources of lubricant supply for each separate frame of grooves in the valve seat and both sources connect with the axial bore 62 in the valve stem.

A sleeve 68 is rotatably mounted within the bore 62 and is provided with an axial passageway 70 extending therethrough but terminating in a blind end 72 adjacent the bottom of the bore 62. The passageway 70 may be threaded for a portion of its length and provided with a check valve 74 seated on the shoulder thus formed in the passageway.

Extending transversely into the sleeve 68 from the blind end 72 of the axial passageway 70 is part of an outlet 76 which then turns in a direction perpendicular thereto and emerges offset from the axis of the sleeve 68. This outlet 76 is thus adapted to register with one or the other of the passages 64 when the sleeve 68 is rotated in the axial bore 62 and to connect the passages with the axial passageway 70. The sleeve 68 may be retained against axial movement in the bore 62 by the provision of a retaining member 78 threadedly engaging the wall of the bore 62 and bearing upon a shoulder 80 formed by a reduced portion 82 extending from the end of the sleeve 68. The reduced portion 82 projects beyond the retaining member 78 and terminates in a second reduced portion 84 which is provided with a key 86 extending longitudinally thereof for a purpose to be described later.

The threaded portion of the passageway 70 is adapted to receive the threaded end 88 of a compressor screw 90 which is provided with an enlarged non-circular end 92 having an aperture 94 therethrough. The compressor screw may be rotated in the passageway 70 by means of a wrench engaging the noncircular end 92 or by means of a rod inserted through the aperture 94.

Lubricant may be introduced into the passageway 70. The sleeve 68, wherein this passageway is formed, thus becomes a reservoir from which lubricant may be forced by operation of the compressor 90. Such lubricant flows through the outlet 76 into the passages 64 for distribution to the valve seat. For convenience, the portion of the lubricating device now to be described is shown as carried by an operating member 96 which engages the squared portion 50 of the valve stem and serves to rotate the valve member in its seat. It will be understood, however, that the valve operating member 96 is utilized merely as a means for supporting the lubricating device of this invention and plays no part in the operation thereof. It will, therefore, be apparent that the parts of the lubricating device now to be described could be supported in any other convenient manner and no particular reliance is placed upon the inclusion of the valve operating member in the structure for this purpose.

Mounted on the projecting end 84 of the sleeve 68 is a driven pinion 98 which is secured against rotation by means of the key 86 engaging therewith. The pinion 98 has a hub portion 100 extending therefrom and forming a bearing end upon which a second or driving pinion 102 is journaled. The pinion 102 has an elongated hub portion 104 extending therefrom and is axially bored of sufficient size to permit insertion and withdrawal of the threaded end 88 of the compressor screw therethrough. The compressor screw 90 is provided with a slot 105 in one side thereof extending from the head 92 to the threaded end 88. A detent 106 projects from the elongated hub 104 of the pinion 102 into the slot 105 and forms means whereby the pinion 102 may be rotated on its bearing 100 upon rotation of the compressor screw.

Operatively engaging with the pinions 98 and 102 are two gears 108 and 110 respectively, which may be formed integrally as shown or may be formed separately and secured together. These gears 108 and 110 are journaled on a bearing pin 112 which is secured to the operating member 96. The operating member 96 may be provided with upstanding walls forming a housing 114 for the gears and pinions. These parts may all be enclosed in the housing by a cover 116 having an opening through which the elongated end 104 of the pinion 102 may extend.

Figure 2:
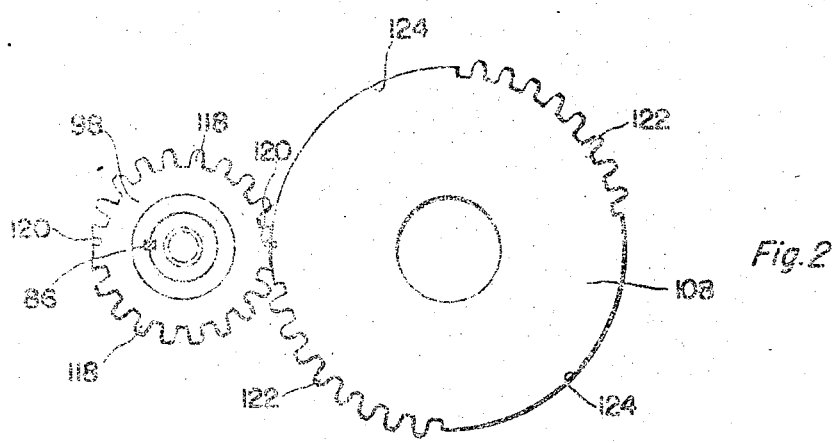
Fig. 2 is a diagrammatic view of a detail of the lubricating device.

The driving pinion 102 and the gear 110, which is in effect an idler, have a complete set of teeth formed on their peripheries. The driven pinion 98 and the gear 108, which is a driver, are not similar in this respect as will now be apparent. By reference to Fig. 2 of the drawings which shows these parts diagrammatically, it will be seen that the pinion 98 has two separate sets of teeth 118 diagrammatically opposite each other and separated by two plain or non-toothed portions 120. It will further be seen that the driving gear 108 also has two separate sets of teeth 122 separated by two plain or non-toothed portions 124. The parts are so arranged that the engagement of the non-toothed portion 124 of the gear 108 with the non-toothed portion 120 of the pinion 98 will serve to retain this pinion in a stationary position due to the friction therebetween.

When the teeth of driving gear 108 mesh with the teeth of the driven pinion 98 the latter will be rotated through 180 degrees and will then present the non-toothed portion on the opposite side to the non-toothed portion on the opposite side of the gear 108. The key 86 for pinion 98, the outlet 76 in the opposite end of the sleeve, and the non-toothed portions of the piston 98 are all in radial alignment. Hence, when the non-toothed portions of the pinion 98 and gear 108 are in engagement, the outlet 64 will be in registry with one or the other of the passages 64 in the valve member.

The operation of the device is as follows: When the pinion 98 and gear 108 are in the operative position shown in Fig. 2, the rotation of the lubricant compressor 90 will cause pinion 102 to drive gear 110, whereupon rotation of gear 108 will occur. As none of the teeth 122 of gear 108 is in mesh with the teeth 118 of pinion 98 no rotation of the pinion 98 will occur. Due to the frictional engagement of the non-toothed portions 124 and 120 of gear 108 and pinion 98 respectively, the latter will be locked in stationary position holding the sleeve 68 against rotation during this period of lost motion. Hence, the lubricant compressor 90 will be caused to move longitudinally in the bore due to its threaded engagement therewith. Such movement of the compressor 90 will force lubricant through the outlet 76 into the passage 64 with which the outlet registers, from where it will be distributed to the lubricant grooves.

After the lost motion period due to engagement of the non-toothed portions has elapsed and gear 108 has rotated sufficiently to engage its teeth 122 with those of pinion 98, the latter will be caused to rotate and revolve the sleeve 68 through an arc of 180 degrees, whereupon the engagement of the non-toothed portions of gears 108 and pinion 98 will again occur and serve to lock these members together. The outlet 76 will then be in registry with the other passage 64 and further rotation of the lubricant compressor will force lubricant to the opposite side of the valve seat. Thus, an alternate lubrication of each side of the valve seat occurs automatically during continued rotation of the lubricant compressor 90.

Figure 3:
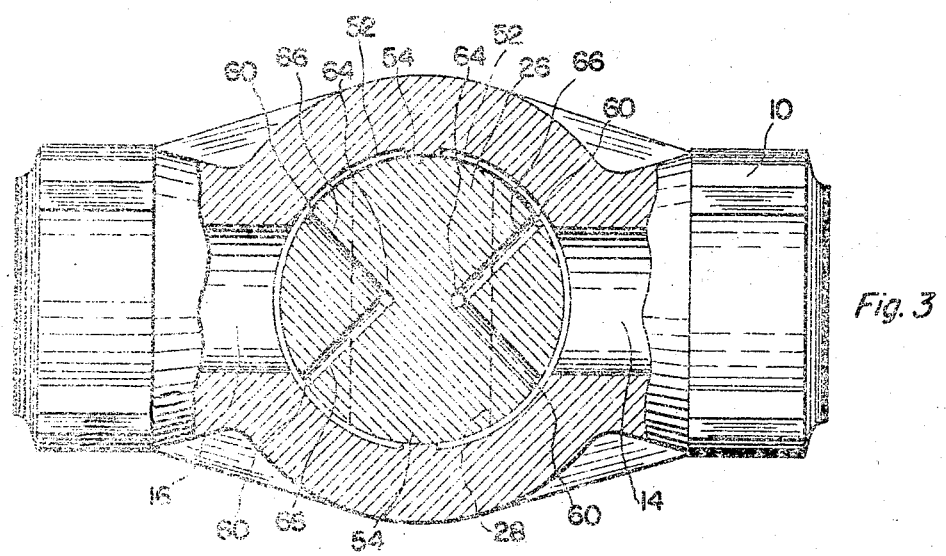
Fig. 3 is a section taken on the line 3—3 of Fig. 1 looking in the direction indicated by arrows and showing the valve in closed position.
Figure 4:
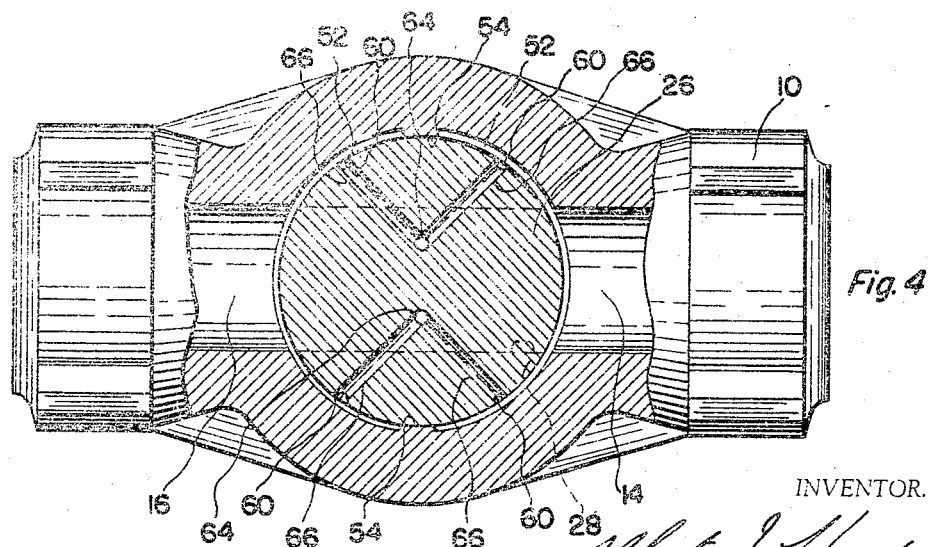
Fig. 4 is a section similar to Fig. 3 but showing the valve in open position.

If the valve member is in closed position as shown in Figs. 1 and 3 and is being forced tightly against one side of its seat due to pressure in the line, it will be apparent that sufficient lubricant pressure can be applied to the valve seat to counteract the effect of the line pressure and free the valve member from its seat. The valve member can then be rotated by actuation of the valve operating member 96 into the open position shown in Fig. 4. In this position the lubricant passages 66 leading from the passages 64 will communicate with the grooves on both sides of the valve seat simultaneously. The valve member is no longer subject to line pressure tending to force it to one side of its seat and lubricant will be distributed to each side of the valve seat whenever the outlet 76 is in registry with a passage 64. It will be observed that the lubricant in the reservoir is placed under the pressure exerted by the compressor 90 only when the outlet 76 is in registry with a passage. At all other times the compressor and reservoir rotate as a unit.

During the rotation of the valve member from open to closed position the lubricating device rotate therewith as a unit without affecting the relative positions of the pinions and gears or the operation of the device in any manner. The lubricant reservoir can be replenished by withdrawing the detent 106 from the slot 104 and removing the lubricant compressor from the sleeve 68. Should the directional control of the lubricant feed not be desired then the removal of the operating member 96 or other supporting means will serve to remove all parts of the lubricating device except the lubricant compressor 90 and the sleeve 68.

It will be understood that modification can be made in the construction of the device and in its mode of application to the structure to be lubricated without departing from the scope of the invention.

I claim:

1. A lubricating device adapted for use in connection with a member having a plurality of lubricant passages, said device comprising a reservoir for lubricant having an outlet registrable with any one of said passages, means having threaded engagement with the reservoir for compressing the lubricant therein and forcing it through the outlet, and means intermittently responsive to actuation of the lubricant compressing means for registering the outlet with any one of said passages while simultaneously preventing compression of said lubricant.

2. A lubricating device adapted for use in connection with a member having a plurality of lubricant passages, said device comprising a reservoir for lubricant having an outlet registrable with any one of said passages, means movable relatively to said reservoir for compressing the lubricant therein and forcing it through said outlet, and means for effecting registry between the outlet and passages, said means being adapted for preventing relative movement of the compressing means and reservoir when the outlet is out of registry with said passages.

3. A lubricating device adapted for use in connection with a member having a plurality of lubricant passages, said device comprising a reservoir for lubricant having an outlet registrable with any one of said passages, means movable relatively to said reservoir for compressing the lubricant therein and forcing it through said outlet, and intermittently operable means for preventing said relative movement while simultaneously effecting registry between the outlet and a passage.

4. A lubricating device for a member provided with a plurality of lubricant passages said device comprising a reservoir for lubricant having an outlet registrable with any one of said passages, means rotatable relatively to said reservoir for compressing the lubricant therein and forcing it through the outlet, and intermittently operable means connected to said compressing means and reservoir for preventing relative rotation therebetween.

5. A lubricating device for a member having a plurality of lubricating passages associated therewith, said device comprising a lubricant reservoir having an outlet registrable with any one of said passages, means having threaded engagement with the reservoir for compressing the lubricant therein and forcing it through the outlet, and means intermittently responsive to the actuation of the lubricant compressing means for directing the lubricant into one or another of said passages alternately while simultaneously preventing compression of said lubricant.

6. A lubricating device for a member having a plurality of lubricant passages said device comprising, a lubricant reservoir movable relatively to said member and having an outlet adapted to move into and out of registry with any one of said passages, means movable relatively to said reservoir for compressing the lubricant therein, and forcing it through the outlet, and means connected to said compressing means and reservoir for effecting registry between the outlet and passages, said means being adapted for preventing said relative movement when the outlet is out of registry with any one of said passages and permitting such movement when registry occurs.

7. A lubricating device for a member having a plurality of lubricant passages said device comprising, a lubricant reservoir movable relatively to said member and having an outlet adapted to move into and out of registry with any one of said passages, means movable relatively to said reservoir for compressing the lubricant therein and forcing it through the outlet, driving means connected to said compressing means, and driven means associated with said reservoir for engagement with the driving means, said driving and driven means effecting registry between the outlet and passages and having a period of lost motion therebetween for intermittently preventing said relative movement of the reservoir.

8. A lubricating device for a member having a plurality of lubricant passages said device comprising, a lubricant reservoir movable relatively to said member and having an outlet adapted to move into and out of registry with any one of said passages, means movable relatively to said reservoir for compressing the lubricant therein and forcing it through the outlet, a driving pinion connected to said compressing means, an idler gear engaging with said pinion, a driving gear secured to said idler gear and having a non-toothed portion thereon, and a driven pinion secured to said reservoir for engagement with said driving gear and having a non-toothed portion frictionally engageable with the non-toothed portion of said driving gear, said non-toothed portions providing a period of lost motion during which said compressing means moves relatively to said reservoir.

9. A lubricating device for a member having a plurality of lubricant passages said device comprising, a sleeve extending axially of said member and being rotatable relatively thereto, said sleeve having a threaded bore forming a lubricant reservoir and an outlet therefor movable into and out of registry with any one of said passages, a compressor screw rotatable in said reservoir for compressing the lubricant therein and forcing it through the outlet, a driving pinion rotatable by said screw, an idler gear engaging with said pinion, a driving gear secured to said idler gear and having a non-toothed portion thereon, a driven pinion secured to said sleeve for engagement with said driving gear, said driven pinion having a non-toothed portion for frictional engagement with the non-toothed portion of said driving gear, said non-toothed portions being in engagement when the outlet is in registry with one of said passages and providing a period of lost motion during which said screw forces the lubricant through the outlet, said non-toothed portions becoming thereafter disengaged to permit rotation of the sleeve by said gears to bring said outlet into registry with another of said passages.

ALBERT J. HENDERSON.